Feb. 26, 1957 R. L. FRANK 2,783,371
PULSED RADIO FREQUENCY SYNCHRONIZING SYSTEM
Filed Nov. 13, 1950 2 Sheets-Sheet 1
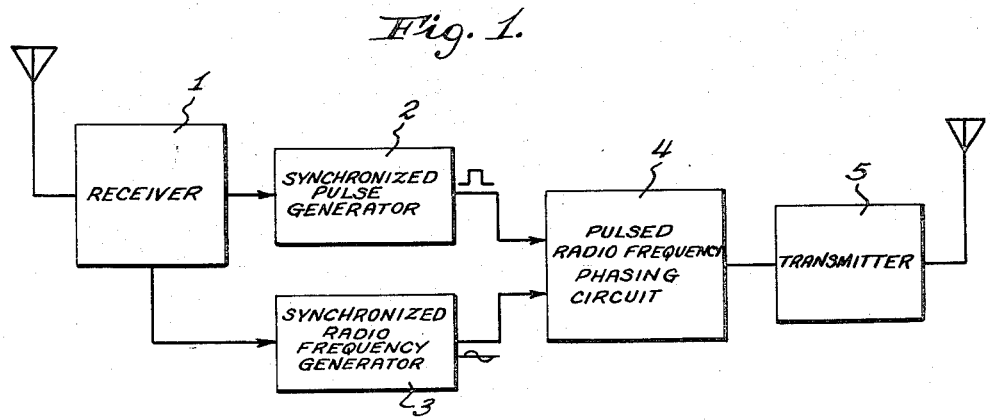
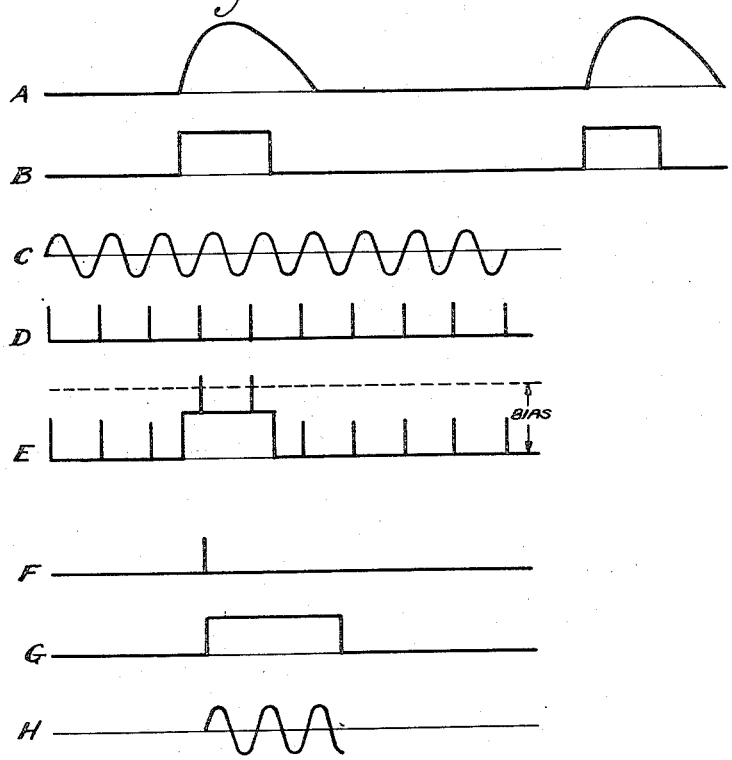
INVENTOR
ROBERT L. FRANK
BY
ATTORNEY INVENTOR
ROBERT L. FRANK
BY
Paul N. Hunter.
ATTORNEY

United States Patent Office 2,783,371
Patented Feb. 26, 1957

2,783,371

PULSED RADIO FREQUENCY SYNCHRONIZING SYSTEM

Robert L. Frank, New York, N. Y., assignor to Sperry Rand Corporation, a corporation of Delaware Application November 13, 1950, Serial No. 195,239

17 Claims. (Cl. 250—15)

This invention relates to means for generating pulsed radio frequency signals having predetermined synchronized phase relations, in response to received signals, and more particularly to the elimination of noise and phase distortion in such signals.

Radio navigation systems such as Loran use synchonized, pulsed, radio frequency signals from pairs of transmitters to determine hyperbolic lines of position. At a receiving location the signals are received and the time or phase difference between signals from a pair of transmitters determines a line of position. The sequence of operations is that one transmitter, called the master, transmits a pulsed radio frequency signal and sometime later the other transmitter of the pair, called the slave station, also transmits a pulsed radio frequency signal which has a predetermined synchronized relation to the master signal. Both of these signals are received at the receiving location and the time difference or phase difference between them is measured.

The accuracy of navigation is proportional to the accuracy of phase measurement which is possible. Standard Loran merely measures the phase between the pulse envelopes. Other systems have been evolved to also measure the phase of the radio frequency cycles which permits a much finer measurement. One of the most formidable problems in these cycle matching systems is to resolve cyclic ambiguity, that is, to select the correct radio frequency cycles to be measured so that phase errors of one or more full radio frequency cycles are eliminated.

To minimize this possibility of cyclic ambiguity it is desirable that the pulses transmitted from both master and slave stations have a fixed and known relationship to the radio frequency cycles within the pulses. If the pulse and radio frequency signals were transmitted with a random time relationship this would increase the possibility of error, since the pulse measurement is used to select the correct radio frequency cycles.

Assume in a specific case that the leading edge of the master signal pulse begins at the same time a radio frequency cycle goes positive. It is then also necessary that the slave transmitter signal have the same predetermined phase relationship. The sequence of operations is as follows. The master station transmits a pulse having the above relation between its leading edge and the radio frequency signal which it comprises. These signals are received at the slave transmitter and used to synchronize the slave transmission. Therefore, at the slave station, the pulse transmissions must be synchronized, the radio frequency transmissions must be synchronized, and in addition the phase between the pulse leading edge and the radio frequency cycle must be reproduced for the slave transmission in the same relation as the master transmission. This last requirement is difficult since the signal received from the master station contains a considerable amount of noise jitter. However, since the phase relationship is predetermined it can be reconstructed or reinserted, thereby eliminating phase distortion effects due to noise up to this point.

This invention provides a system which automatically performs the above mentioned synchronizing functions of the slave transmitter and transmits a noise free synchonized slave signal. The present invention accomplishes this purpose by providing separate means for synchronizing the pulse signals, and the radio frequency signals, and additional means for combining these synchronized signals to generate the control signal which automatically gates the radio frequency signal in pulses having the originally transmitted phase relation between the pulse envelope and the radio frequency signal. This eliminates the effects of phase distortion due to noise between the master and slave stations.

Accordingly, one object of the present invention is to provide a noise free transponder.

Another object of the invention is to provide an automatically pulsed radio frequency synchronizer wherein the pulse and radio frequency signals have a predetermined phase relation.

Another object of the invention is to provide a Loran slave transmitter having pulse signals in synchronism with a master transmitter and having radio frequency signals in synchronism with the master transmitter radio signals.

Another object of the present invention is to provide a Loran slave transmitter generating pulse signals in synchronism with the master pulse signals, generating radio frequency signals in synchronism with the master radio frequency signals, and automatically reproducing a predetermined phase relation between the pulse and radio frequency signals.

Another object of the present invention is to eliminate cyclic ambiguity due to transmission in a cycle matching navigation system.

Another object of the present invention is to eliminate the effect of noise upon the synchronism of the master and slave signals.

Another object of the present invention is to provide means for combining pulse signals and radio frequency signals in a predetermined phase relationship.

Another object of the present invention is to provide an improved synchronizer.

These and other objects will become apparent from the following specification and drawings of which:

Fig. 1 is a schematic block diagram of an embodiment of the invention;

Fig. 3 is a series of waveforms illustrative of the operation of the invention.

Figure 2:
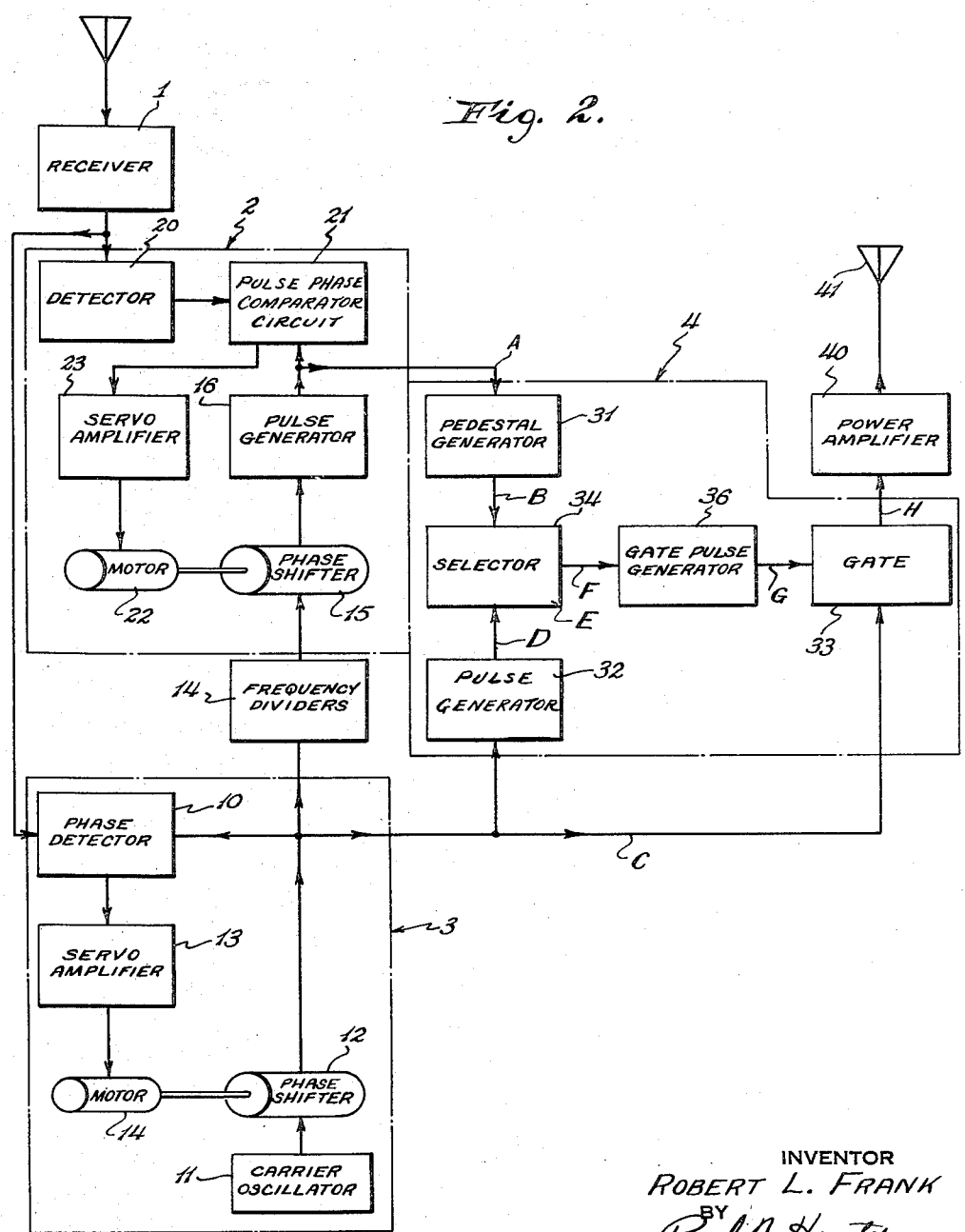
Fig. 2 is a schematic block diagram of an embodiment of the invention.

Fig. 1 illustrates the main components of the system in outline form. A receiver 1 receives pulsed radio frequency signals from the master transmitter. Pulse signals are generated locally in synchronism with the received pulses by synchronized pulse generator 2. Radio frequency signals are locally generated in synchronism with the received radio frequency signals in synchronized radio frequency generator 3.

The locally generated pulses and radio frequency signals are combined in a predetermined relationship in the pulsed radio frequency phasing circuit 4. These properly phased combined signals are then transmitted by transmitter 5. The present invention lies primarily in the means 4 for phasing the radio frequency signals with the separately generated pulse signals, and in the combination of this phasing circuit with the other synchronizing circuits 2 and 3.

These elements will be discussed in detail in connection with Fig. 2, but will be generally treated at the present time. The function of the synchronized pulse generator 2 is to generate a local pulse signal in synchronism with the received pulsed signals. There are circuits in the prior art which will perform this function and they generally comprise a comparator circuit or phase detector which drives a phase shifter in the output circuit of the locally generated signal. One circuit which might be used in this connection is disclosed in the application Serial No. 117,917 of Walter Dean entitled "Pulse Synchronizer," filed September 15, 1949.

Synchronized radio frequency generator 3 may comprise a carrier oscillator the output of which is phase shifted in response to a phase detector which samples and compares its output and the received signal. Such a circuit is disclosed in application Serial No. 91,659, in the name of Philip W. Crist, entitled "Phase Responsive Apparatus," filed May 6, 1949.

Upon superficial examination it would appear that if the local and received pulses are synchronized and the local and received radio frequency signals are synchronized separately at the slave transmitter that, when they are combined, they would fall into the same phase relation as existed in the master transmitter. Though this is theoretically correct it does not take into account the fact that a considerable amount of noise and undesired signals are also received by the receiver 1. There are also unavoidable phase shifts in the various equipments. These distortions have a definite effect on the phase relations of the received signals. However, it has been found that by careful design it is possible to limit the phase shift of the received pulses to less than one radio frequency cycle. Since the error can be limited to one cycle the effect of the noise may be avoided entirely by means of the present invention. This is possible because the phase relationship is an arbitrary predetermined one and it may be regenerated or reconstructed at the slave transmitter.

Therefore, the effects of noise between the master and slave transmitters upon the phase relationship between the pulses and the radio frequency signals may be eliminated by reconstructing or regenerating the same phase relationship in the slave transmitter as existed when the pulses were transmitted from the master station. The only limitation is that the slave transmitter must know which radio frequency cycle must be lined up with the pulse leading edge, and this may be determined if the error in phase is less than one radio frequency cycle.

Fig. 2 illustrates a more detailed embodiment of the invention. In this embodiment the radio frequency signals are received by receiver 1 and connected to phase detector 10. Local radio frequency signals are generated by oscillator 11, the output of which is connected to phase shifter 12. The locally generated signals are compared with the received signals in phase detector 10, the output of which drives a servo amplifier 13 which actuates motor 14 to rotate the phase shifter 12. Thus, this servo loop synchronizes the locally generated sine wave signals with the received sine wave signals. This circuit is similar to that of the above-mentioned Crist application.

The locally generated signals are also fed to a divider chain 14 where they are divided down to the pulse frequency. The output of the divider chain is connected through a phase shifter 15 to a pulse generator 16.

The received pulses from receiver 1 are detected in amplitude detector 20 and then applied to phase comparator circuit 21, where they are compared in phase with the locally generated pulses from the pulse generator 16. The shape or duration of the locally generated pulses as compared to the received pulses is not necessarily critical. It is, however, important that the leading edges of the respective pulses be in synchronism. The reason for this will appear more fully in the detailed description of the operation of the system described hereinafter. If they are not in synchronism the pulse phase comparator circuit 21 provides a signal to servo amplifier 23 which actuates phase shifter 15 through motor 22 to cause synchronism between the two signals.

It will be noted that a separate oscillator could be used to excite phase shifter 15, in lieu of dividing the output of oscillator 11. This alternative is shown diagrammatically in Fig. 1. The separate oscillator could also be frequency controlled in response to the pulse phase comparator circuit 21, as taught in the above-mentioned Dean application.

All the circuits thus far described in connection with Fig. 2 may be conventional. The present invention resides particularly in the remaining circuits of Fig. 2 and in the entire combination of Fig. 2.

The synchronized pulses from generator 16 are illustrated by waveform A of Fig. 3. They may be applied, with a coding delay if desired, to pedestal generator 31 which generates a square pedestal voltage as shown in Fig. 3B. The square wave pedestal voltage thus generated need not be of the same duration as either the locally generated pulses or the received pulses. The pedestal voltage need only have its leading edge in synchronism with the received pulses. The time duration of the pedestal voltage may vary but must be at least that of one radio frequency cycle. The coding delay has not been shown as it is outside the scope of the invention. The leading edge of this pedestal voltage is now synchronized with the received pulses, and therefore may be somewhat unstable due to received noise jitter.

The radio frequency output (Fig. 3C) from radio frequency generator 3 is connected both to a pulse generator circuit 32 and a gate circuit 33. The pulse generator circuit 32 generates a series of positive pulses or pips (Fig. 3D), which occur at the instant the sine wave goes positive. These pips are applied to selector circuit 34.

There are two signals applied to the selector 34, namely, the pedestal (Fig. 3B) and the pips (Fig. 3D). The selector 34 may be a biased flip-flop trigger circuit. The selector circuit 34 is arranged to be triggered on by the first pip which coincides with the pedestal thereby overcoming the bias as illustrated in Fig. 3E, and this generates a trigger voltage (Fig. 3F). The selector circuit 34 is preferably made insensitive to any closely following second pip which coincides with the pedestal by suitably providing a slow recovery time. This trigger voltage is applied to gate generator 36 which generates a voltage gate of rectangular form (Fig. 3G). Gate generator 36 may be a square wave generator or a multivibrator. The gate pulse triggers on the gate circuit 33, for the time shown by the waveforms of Fig. 3. This causes the gate circuit 33 to pass the radio frequency cycles (Fig. 3C) applied to it. The gated pulse to be transmitted has now been reinserted in the proper phase relation, namely, that the pulse shall start at the time the radio frequency signal goes positive. The properly phased signals are then amplified in conventional power amplifier 40 and transmitted on antenna 41. It should be noted that, while not necessarily so, in most cases of practical operation of the synchronizer in a typical Loran slave transmitter, the transmitted slave pulses will have the same time duration as the received master pulses as illustrated by waveforms A, G and H of Fig. 3. By comparison, the square wave pedestal voltage, as shown by waveforms B and E of Fig. 3, need not be of the same duration as the received master pulse or the transmitted slave pulse. The pedestal voltage need only have its leading edge in synchronism with the received pulse and be of sufficient time duration to encompass at least one cycle of the radio frequency of the received pulse. The waveforms are idealized for illustrative purposes and are not shown in actual scale. There may be many more sine waves of radio frequency per pulse than the number shown. Similarly, other phase relationships between the pulse envelope and the radio frequency may be automatically regenerated at the slave station.

The invention is not limited to a Loran slave transmitter but may be used whenever it is desired to synchronize pulse and sine wave signals.

This particular phase relationship was arbitrarily chosen and is not the only relation that may be used. For instance, a phase shifter could be inserted in the connection from phase detector 10 to gate 33 to alter this relation. In the operation of a Loran slave transmitter, it is the usual practice to delay transmission of the slave pulse ½ pulse repetition period in addition to a pulse coding delay. This type of delay may be interposed in the present system but is not necessary to the operation of the invention. The important fact is that the phase relationship between the pulse and the radio frequency signals is a predetermined one and, it may be automatically regenerated or reconstructed at a slave station and reinserted into the system, thereby automatically eliminating any distortions of less than a full cycle caused by noise between the master and the slave stations. The allowable noise tolerance for the automatic operation of this invention is one cycle or ±½ cycle. Any effects due to noise within this tolerance will be eliminated without further adjustment after the predetermined phase relationship is established in the slave transmitter system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A transponder for retransmitting noise-free pulsed radio frequency signals wherein the radio frequency signals and the pulse envelope have a definite phase relationship, comprising a receiver for receiving pulsed radio frequency signals, means connected to said receiver for generating a local radio frequency signal in synchronism with said received radio frequency signal, means connected to said receiver for generating a local pulse signal in synchronism with said received pulse signal, and means for transmitting said generated radio frequency signal and said generated pulse signal in a predetermined phase relation, comprising means to generate a square wave in synchronism with said pulses, means to generate trigger voltages in synchronism with said radio frequency waves, means to select one of said trigger voltages with said square wave, means to trigger a gate pulse generator with said selected trigger and means to gate the radio frequency waves with said gate pulse to thereby create a pulsed radio frequency signal having the pulse leading edge in synchronism with a selected radio frequency cycle.

2. Means for combining low frequency pulse signals and high frequency sine wave signals in a definite phase relation comprising means to generate a square wave in synchronism with said pulses, means to generate trigger voltages in synchronism with said sine waves, means to select one of said trigger voltages with said square wave, means to trigger a gate pulse generator with said selected trigger and means to gate the sine waves with said gate pulse to thereby create a pulsed radio frequency signal having the pulse leading edge in synchronism with a selected radio frequency cycle.

3. Means for combining low frequency pulse signals and high frequency sine wave signals in a definite phase relation comprising means to generate a square wave at a desired pulse frequency, means to generate sharp triggers in synchronism with said sine waves, means to select one of said triggers with said square wave, means to trigger a gate pulse generator with said selected timing trigger and means to gate the sine waves with said gate pulse to thereby create a pulsed radio frequency signal having a predetermined phase relation.

4. A synchronizer comprising means for generating a locally synchronized pulse in synchronism with a received pulse, means for generating a local radio frequency signal in synchronism with a received radio frequency signal, and means for generating a pulsed signal having a predetermined relation between said radio frequency signal and said pulse signal, comprising means to generate a square wave in synchronism with said pulses, means to generate trigger voltages in synchronism with said radio frequency waves, means to select one of said trigger voltages with said square wave, means to trigger a gate pulse generator with said selected trigger and means to gate the radio frequency waves with said gate pulse to thereby create a pulsed radio frequency signal having the pulse and leading edge in synchronism with a selected radio frequency cycle.

5. A synchronizer comprising means for generating a locally synchronized pulse signal in synchronism with a received pulse, means for generating a local radio frequency signal in synchronism with a received radio frequency signal and means for regenerating a pulsed signal having a predetermined synchronized phase relation between said radio frequency signal and said pulse signal, comprising means to generate a square wave in synchronism with said pulses, means to generate trigger voltages in synchronism with said radio frequency waves, means to select one of said trigger voltages with said square wave, means to trigger a gate pulse generator with said selected trigger and means to gate the radio frequency waves with said gate pulse to thereby create a pulsed radio frequency signal having the pulse leading edge in synchronism with a selected radio frequency cycle.

6. A Loran transmitter comprising a receiver for receiving a pulsed radio frequency signal, means connected to said receiver for generating a local radio frequency signal in phase with said received radio frequency signal, means connected to said receiver for generating a local pulse frequency signal in phase with said received pulse signal, phase comparator means responsive to the combined signals of said locally generated radio frequency signal and said locally generated pulse frequency signal, and gate means connected to said phase comparator means and connected to receive said locally generated radio frequency, said gate means being responsive to said phase comparator means to gate said locally generated radio frequency thereby producing pulses having envelopes of predetermined phase relation to said radio frequency.

7. A Loran slave transmitter comprising a receiver for receiving a pulsed radio frequency signal, means connected to said receiver for generating a local radio frequency signal in phase with said received radio signal, means connected to said receiver for generating a local pulse signal in phase with said received pulse signal, and means connected to said two generating means for keying said generated radio frequency signal in pulses wherein the pulse envelope has a predetermined phase relation to the radio frequency signal, said last named means comprising selector means responsive to said generated pulse to select a cycle of said generated radio frequency signal, and gate means connected to said source of locally generated radio frequency signals and to said selector means for automatically transmitting said pulses in synchronism with said selected cycle.

8. A transponder for retransmitting noise free pulsed radio frequency signals wherein the radio frequency signals and the pulse envelope have a predetermined phase relationship comprising a receiver for receiving pulsed radio frequency signals, means connected to said receiver for generating a local radio frequency signal in synchronism with said received radio frequency signal, means connected to said receiver for generating a local pulse signal in synchronism with said received pulse signal, and means connected to said two generating means for keying said generated radio frequency signal in pulses wherein the pulse envelope has a predetermined phase relation to the radio frequency signal, said last named means comprising phase comparator means responsive to the two locally generated signals, means responsive to said phase comparator signal to generate a square wave in synchronism with said combined signals, and gate means connected to said source of locally generated radio frequency signals and responsive to said square wave means to transmit said pulses in synchronism with said combined signals.

9. A slave transmitter comprising a receiver for receiving a pulsed radio frequency signal, means connected to said receiver for generating a local radio frequency signal in phase with said received radio frequency signal, means connected to said receiver for generating a local pulse signal in phase with said received pulse signal, and phase comparator means connected to said two last named means for gating said generated radio frequency signal in pulses wherein the envelope of said pulses has a predetermined phase relation to said generated radio frequency signal and has a wave front synchronized to the coincidence of said locally generated radio frequency with said locally generated pulse signal.

10. A slave transmitter comprising a receiver for receiving a pulsed radio frequency signal, means connected to said receiver for generating a local radio frequency signal in phase with said received radio frequency signal, means connected to said receiver for generating a local pulse signal in phase with said received pulse signal, and means connected to said two last named means for providing a predetermined phase relationship between said generated radio frequency signal and said generated pulse signal, said last named means comprising means to generate timing pips at said radio frequency, selector means responsive to said generated pulse to select a timing pip of said generated radio frequency, and gate means connected to said locally generated radio frequency and responsive to said selected radio frequency timing pip to transmit a pulse of radio frequency signals wherein the pulse envelope has said predetermined phase relation to the radio frequency signal.

11. In a transponder for retransmitting pulsed radio frequency signals wherein the radio frequency signals and the pulse envelope have a predetermined phase relationship, a receiver for receiving pulsed radio frequency signals, means for eliminating received noise comprising means connected to said receiver for generating a local radio frequency signal in synchronism with said received radio frequency signal, means connected to said receiver for generating a local pulse signal in synchronism with said received pulse signal, means connected to and responsive to said two generating means for synthesizing a signal having said predetermined time relation between said generated radio frequency signal and said generated pulse signal, and means connected to said synthesizing means and to gate said locally generated radio frequency signals, said gate means being responsive to said synthesized signal whereby said locally generated radio frequency signals are automatically gated in pulses having envelopes of said predetermined phase relation to said radio frequency.

12. In a transponder for retransmitting pulsed radio frequency signals wherein the radio frequency signals and the pulse enevolpe have a predetermined phase relationship, a receiver means for minimizing pulsed radio frequency signal phase distortion due to noise comprising means connected to said receiver for generating a local radio frequency signal in synchronism with said received radio frequency signal, means connected to said receiver for generating a local pulse signal in synchronism with said received pulse signal, means connected to said two generating means for combining said generated pulse and said radio frequency signal, said last named means comprising means responsive to said generated pulse to select a predetermined cycle of said generated radio frequency signal, and gate means connected to said locally generated radio frequency signal and to said combining means, said gate means being responsive to said selected radio frequency cycle to transmit a pulse of locally generated radio frequency signal wherein the pulse envelope has said predetermined phase relation to the selected radio frequency cycle.

13. A Loran transmitter comprising a receiver for receiving a pulsed radio frequency signal, means connected to said receiver for generating a local radio frequency signal in synchronism with said received radio frequency signal, means connected to said receiver for generating a local pulse frequency signal in synchronism with said received pulse signal, means for producing a signal at at predetermined phase relation between said locally generated signals, and gate means connected to said last named signal-producing means and connected to receive said locally generated radio frequency, said gate means being responsive to said signal-producing means to gate said locally generated radio frequency thereby producing pulses having envelopes of predetermined phase relation to said radio frequency.

14. A Loran transmitter comprising a receiver for receiving a pulsed radio frequency signal, means connected to said receiver for generating a local radio frequency signal in synchronism with said received radio frequency signal, means connected to said receiver for generating a local pulse frequency signal in synchronism with said received pulse signal, means for producing a signal at a predetermined phase relation between said locally generated signals, and means connected to said last named signal-producing means and connected to receive said locally generated radio frequency, said means being responsive to said signal-producing means to form pulses having envelopes of predetermined phase relation to said radio frequency.

15. A Loran transmitter comprising a receiver for receiving a pulsed radio frequency signal, means connected to said receiver for generating a local radio frequency signal in synchronism with said received radio frequency signal, means connected to said receiver for generating a local pulse frequency signal in synchronism with said received pulse signal, means for producing a signal at a predetermined phase relation between said locally generated signals, and gate means connected to said last named signal-producing means and connected to receive said locally generated radio frequency, said gate means being responsive to said signal-producing means to gate said locally generated radio frequency thereby producing pulses having envelopes of the same phase relation to said radio frequency as said combined signals have to said radio frequency.

16. A synchronizer comprising means for generating a pulse in synchronism with a received pulse, means for generating a radio frequency signal in synchronism with a received radio frequency signal, means to generate a square wave in synchronism with said pulses, means to generate trigger voltages in synchronism with the positive going cross-over of said radio frequency waves, means to select one of said trigger voltages with said square wave, means to trigger a gate pulse generator with said selected trigger, and means to gate the radio frequency waves with said gate pulse to thereby produce a pulsed radio frequency signal having the pulse leading edge in synchronism with the positive going cross-over of the selected radio frequency cycle.

17. A synchronizer comprising means for generating a pulse in synchronism with a received pulse, means for generating a radio frequency signal in synchronism with a received radio frequency signal, means to generate a square wave having its leading edge in synchronism with said pulses and being of not less than one of said radio frequency cycles in duration, means to generate trigger voltages in synchronism with said radio frequency waves, means to select the first of said trigger voltages coincident with said square wave, means to trigger a gate pulse generator with said selected trigger, and means to gate the radio frequency waves with said gate pulse to thereby produce a pulsed radio frequency signal having the pulse leading edge in synchronism with the first of said trigger voltages coincident with said square wave.

References Cited in the file of this patent

UNITED STATES PATENTS

| | | | |
|---|---|---|---|
| 2,277,000 | Bingley | Mar. 17, | 1942 |
| 2,422,204 | Meacham | June 17, | 1947 |
| 2,425,315 | Atwood et al. | Aug. 12, | 1947 |
| 2,425,316 | Dow | Aug. 12, | 1947 |
| 2,482,974 | Gordon | Sept. 27, | 1949 |
| 2,521,058 | Goldberg | Sept. 5, | 1950 |
| 2,578,980 | O'Brien | Dec. 18, | 1951 |